US 6,594,854 B1

(12) United States Patent
Matsumoto et al.

(10) Patent No.: US 6,594,854 B1
(45) Date of Patent: Jul. 22, 2003

(54) WIPER DEVICE HAVING WIPER BLADE EASILY ATTACHABLE TO AND DETACHABLE FROM WIPER ARM

(75) Inventors: Hiroshi Matsumoto, Hamamatsu (JP); Masami Muramatsu, Hamana-gun (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/526,866

(22) Filed: Mar. 16, 2000

(30) Foreign Application Priority Data

Apr. 6, 1999 (JP) .......................................... 11-098864
Jun. 11, 1999 (JP) .......................................... 11-166081

(51) Int. Cl.⁷ .................................................. B60S 1/40
(52) U.S. Cl. ................................ 15/250.32; 15/250.44; 15/250.351
(58) Field of Search ........................ 15/250.32, 250.31, 15/250.44, 250.33, 250.46, 250.43, 250.351

(56) References Cited

U.S. PATENT DOCUMENTS

| 2,404,523 A | * | 7/1946 | Nesson | ............... | 15/250.32 |
| 3,576,044 A | * | 4/1971 | Besnard | ............... | 15/250.32 |
| 3,659,309 A | * | 5/1972 | Besnard | ............... | 15/250.32 |
| 4,348,782 A | * | 9/1982 | Fournier | ............... | 15/250.32 |
| 4,878,263 A | * | 11/1989 | Raymond | ............... | 15/250.32 |
| 6,226,829 B1 | * | 5/2001 | Kotlarski | ............... | 15/250.32 |

FOREIGN PATENT DOCUMENTS

| DE | 44399 | * | 7/1956 | ............... | 15/250.32 |
| DE | 1200704 | * | 9/1965 | ............... | 15/250.32 |
| DE | 3709915 | * | 10/1988 | ............... | 15/250.32 |
| FR | 2254959 | * | 7/1975 | ............... | 15/250.32 |
| JP | 60-78655 | | 6/1985 | | |
| JP | 6-156200 | | 6/1994 | | |

* cited by examiner

Primary Examiner—Gary K. Graham
(74) Attorney, Agent, or Firm—Posz & Bethards, PLC

(57) ABSTRACT

A wiper device has a center bore provided at a wiper blade, a supporting shaft disposed in the center bore and a connecting hole provided at a leading end portion of the wiper arm. The supporting shaft has first and second diameter portions at a circumference thereof and a diametric length of the second diameter portion is smaller than that of the first diameter portion The connecting hole is provided at a circumference thereof with an opening whose chord length is larger than the diametric length of the second portion but smaller than the diametric length of the first portion. The wiper blade may be attached to and detached from the wiper arm by making the second diameter portion correspond to the opening, but the wiper blade may not be detached from the wiper arm in a normal use of the wiper device by rotating the wiper blade relatively to the wiper arm till a position where the second diameter portion does not correspond to the opening in the connecting hole.

15 Claims, 7 Drawing Sheets

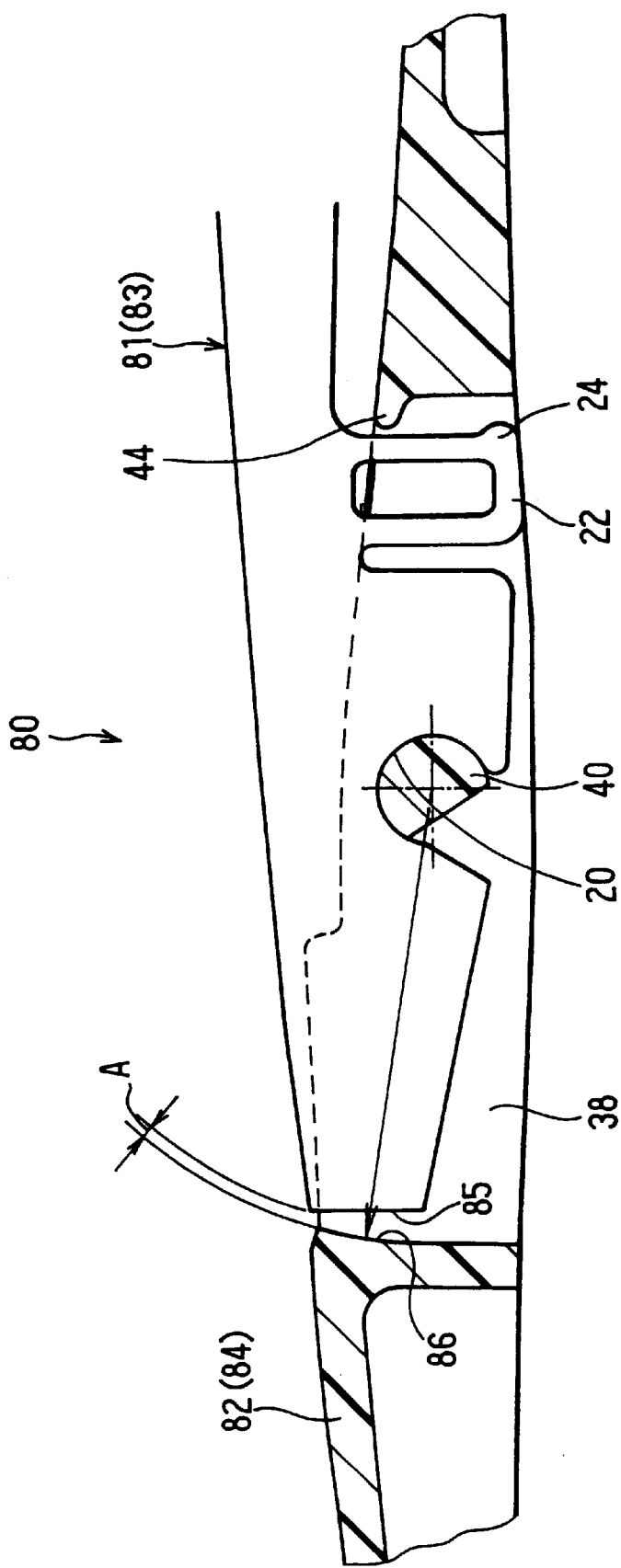

WIPER DEVICE HAVING WIPER BLADE EASILY ATTACHABLE TO AND DETACHABLE FROM WIPER ARM

CROSS REFERENCE TO RELATED APPLICATIONS

This application is based upon and claims the benefit of priority of Japanese Patent Applications No. H.11-98864 filed on Apr. 6, 1999 and No. H.11-166081 filed on Jun. 11, 1999, the contents of which are incorporated herein by reference.

BACKGROUND OF THE INVENTION

1. Field of the Invention

The present invention relates to a wiper device for vehicles in which a:wiper:blade may be easily attached to and detached from a wiper arm.

2. Description of Related Art

In a wiper device for wiping a wind shield glass of a vehicle, a wiper blade is rotatably held by a wiper arm. Generally, the wiper blade is held by the wiper arm in such a manner that a holding clip for holding the wiper blade is.mounted on the wiper arm by a supporting shaft and a letter U shaped leading end portion of the wiper arm is retained to the holding clip.

However, as the holding clip becomes necessary in order for the wiper arm to hold the wiper blade, more number of component parts and more fabrication times-are required, thus resulting in higher cost.

To cope with this problem, proposed has been a wiper device, as shown in JP-A-6-156200, in which the wiper arm and blade are easily attachable and detachable with less number of component parts so that the cost may become less. According to this wiper device, a supporting shaft directly bridges the opposite side walls of the wiper blade in a width direction and the leading end portion of the wiper arm is elastically and rotatably connected to the supporting shaft. Further, the rotating movement of the wiper blade relative to the wiper arm is restricted in a way that the leading end portion of the wiper arm comes in contact with the wiper blade.

However, the connection of the wiper blade with the wiper arm relies upon elastic supporting force on the supporting shaft provided at the wiper blade. Therefore, when a strong rotating force is applied to the wiper blade, though the leading end of the wiper arm comes in contact with the wiper blade and the rotating movement of the wiper blade is restricted, there is a risk that the contacting point between the wiper arm and the wiper blade acts as a fulcrum so that the leading end portion of the wiper arm may be unexpectedly detached from the supporting shaft by the strong rotating force against the elastic supporting force on the supporting shaft. As a result, the wiper blade and the wiper arm are likely to be separated from each other.

SUMMARY OF THE INVENTION

The present invention has been made in view of the above mentioned problem, and an object of the present invention is to provide a wiper device for vehicles having a simple construction that the wiper blade is easily attached to and detached from the wiper arm but the wiper blade and the wiper arm are rotatably coupled not to be disengaged with each other in a normal use of the wiper device. In the wiper device, when the wiper blade is detached from the wiper arm for a purpose of the maintenance, an excessive rotating movement of the wiper blade relative to the wiper arm is adequately restricted so that not only the wiper arm and blade may not be harmed, but also a vehicle body or a window glass may be prevented from damages.

To achieve the above object, the wiper device has a center bore provided in a center portion of the wiper blade, a supporting shaft extending transversely to a longitudinal axis of the wiper blade in the center bore and a connecting hole provided transversely to a longitudinal axis of the wiper arm at a leading end portion of the wiper arm. The supporting shaft has first and second diameter portions extending respectively in an axial direction thereof at a circumference thereof and a diametric length of the second diameter portion is smaller than that of the first diameter portion. The connecting hole is provided at a circumference thereof with an opening whose chord length is larger than the diametric length of the second diameter portion but smaller than the diametric length of the first diameter portion.

With the construction mentioned above, the wiper blade may be attached to and detached from the wiper arm by making the second diameter portion correspond to the opening and moving the second diameter portion through the opening into and out of the connecting hole in the center bore, but the wiper blade may not be detached from the wiper arm in a normal use of the wiper device by rotating the wiper blade relatively to the wiper arm till a position where the second diameter portion does not correspond to the opening in the connecting hole.

As mentioned above, for coupling the wiper blade with the wiper arm, the position of the second diameter portion relative to the opening defines an attachable and detachable region and a non-attachable and non-detachable region for the wiper arm and blade. The attachable and detachable region covers a first predetermined angle zone of the wiper blade to the wiper arm where the second diameter portion corresponds to the opening. The non-attachable and non-detachable region covers a second predetermined angle zone of the wiper blade to the wiper arm where the second diameter portion does not correspond to the opening due to rotating the wiper blade relatively to the wiper arm from the first predetermined angle zone. The second predetermined angle zone is used in a normal use of the wiper device.

As a result, the coupling of the wiper blade with the wiper arm can not be disengaged during the normal use of the wiper device but the wiper blade can be easily attached to and detached from, the wiper arm without large force by rotating the wiper blade relatively to the wiper arm when the wiper blade is replaced for maintenance purpose.

Further, according to the embodiment mentioned above, different from the conventional unstable coupling that the supporting shaft is held by an elastic force, the coupling construction of the present invention is so stable that the wiper blade may not be unexpectedly disengaged and separated from the wiper arm during the normal use thereof.

It is an another aspect of the present invention to provide elastically deformable restraining means at the wiper arm and blade for restraining an excessive rotation of the wiper blade relative to the wiper arm during the normal use of the wiper device from the second predetermined angle zone to the first predetermined angle zone. Thus, the second diameter portion may not correspond to the opening and the wiper blade may not be detached from the wiper arm once the wiper arm and blade are placed at the second predetermined angle zone.

The elastically deformable restraining means serves to prevent not only damages of the vehicle body or wind shield glass but also an easy disengagement of the wiper blade with the wiper arm, due to unintentional excessive rotation of the wiper blade relative to the wiper arm, for example, when the wiper arm is rocked back for a purpose of maintenance. However, if the excessive force is applied intentionally to the elastically deformable restraining means in such a case that the wiper blade is replaced for maintenance, the coupling of the wiper blade with the wiper arm may be disengaged without harms of the wiper arm and blade.

The elastically deformable restraining means is preferably composed of an elastically deformable element disposed at any one of the wiper arm and blade and a restraining element disposed at the other of the wiper arm and blade. The elastically deformable element is engaged with the restraining element between the first and second predetermined angle zones.

Preferably, more than half of an outer circumference surface of the supporting shaft in the connecting hole comes in sliding contact with an inner circumference surface of the connecting hole in the normal use of the wiper device.

With the construction mentioned above, even if the supporting shaft has the second portion whose diametric length is smaller than the length of the opening, the supporting shaft stays stable in the connecting hole not to come out of the connecting hole through the opening and does not rattle in the connecting hole in the normal use of the wiper device.

Generally, the center bore and the supporting shaft may be provided at a center portion of a lever assembly (primary lever) of the wiper blade. However, in case of the wiper blade having a lever assembly, a clip holder fixed to the lever assembly and a blade rubber held by the lever assembly for wiping the wind shield glass, the center bore and the supporting shaft may be disposed in the clip holder.

Furthermore, in a case that the center bore has an inner wall facing to a leading end surface of the wiper arm, it is preferable that a clearance between an upper periphery surface of the inner wall and the leading end surface of the wiper arm is not larger than a clearance between the other surface of the inner wall and the leading end surface of the wiper arm. This construction is effective to prevent snow, stone pieces or other foreign material from being stuck in the clearance between the surface of the inner wall and the leading end surface of the wiper arm.

To achieve this construction, the surface of the inner wall is formed in an inclined shape or in an arc shape having a center on an axis of the supporting shaft, or a projecting portion protruding toward the leading end surface of the wiper arm is provided at the upper periphery portion of the inner wall.

Furthermore, in addition to the construction mentioned above, it is more preferable that the surface of the inner wall overlaps at least partly the leading end surface of the wiper arm as viewed perpendicularly to the longitudinal axis of the wiper blade so that a view through the clearance from one side to the other side may be obstructed. To this end, the leading end surface of the wiper arm is preferably shaped as an arc having a center on a center axis of the connecting hole concentrically with that of the surface of the inner wall.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 6 is a cross sectional view showing a coupling construction of wiper arm and blade according to a third embodiment of the present invention;

DETAILED DESCRIPTION OF THE PREFERRED EMBODIMENTS

A first preferred embodiment of the present invention is described hereinafter according to FIGS. 1 to 3.

Figure 1A:
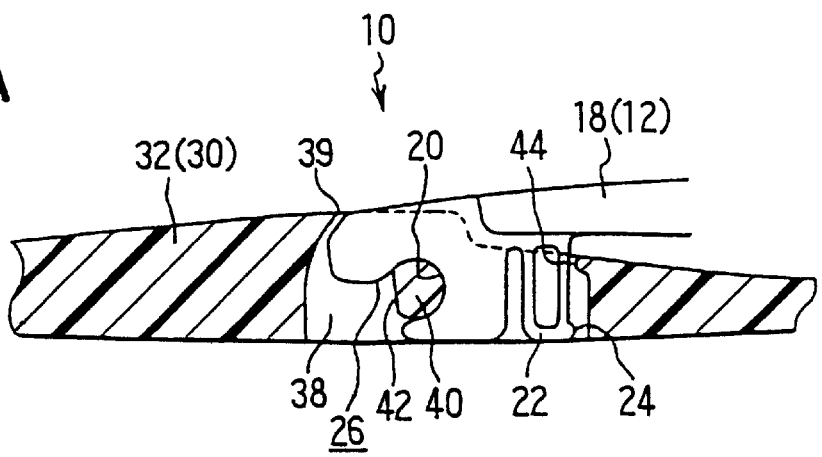
FIG. 1A is a first cross sectional view showing a relative rotation of a wiper blade to a wiper arm according to a first embodiment of the present invention.
Figure 1B:
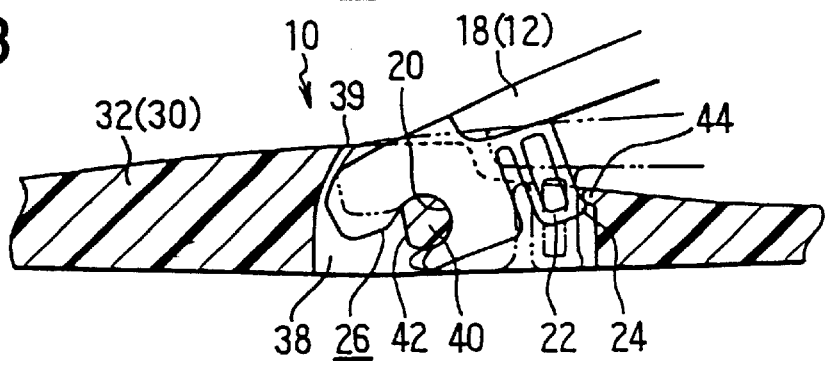
FIG. 1B is a second cross sectional view showing the relative rotation of the wiper blade to the wiper arm according to the first embodiment of the present invention.
Figure 1C:
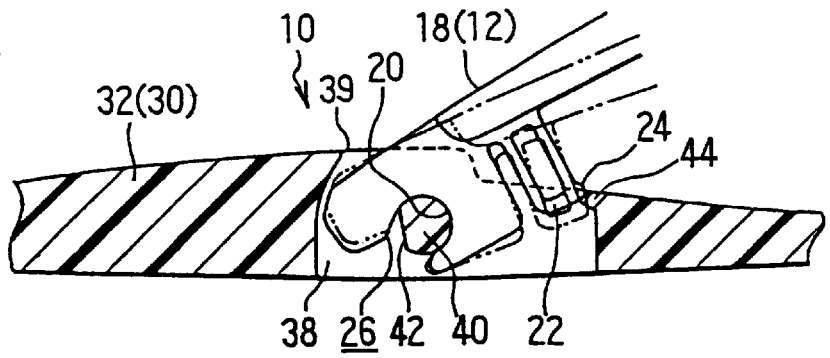
FIG. 1C is a third cross sectional view showing the relative rotation of the wiper blade to the wiper arm according to the first embodiment of the present invention.
Figure 1D:
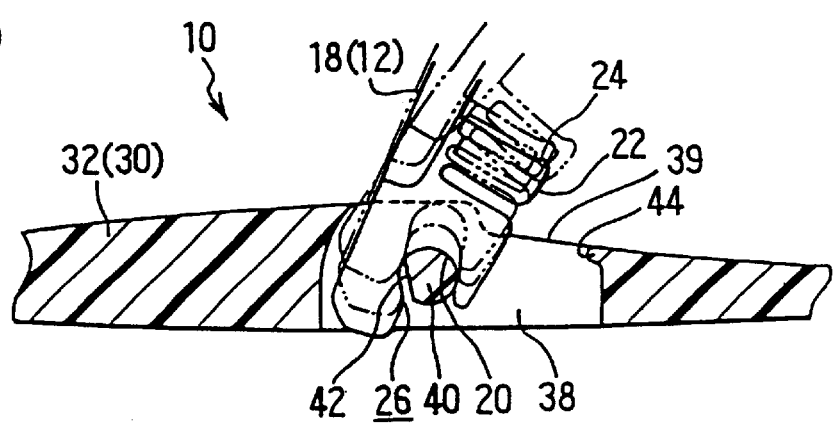
FIG. 1D is a fourth cross sectional view showing the relative rotation of the wiper blade to the wiper arm according to the first embodiment of the present invention.
Figure 2:
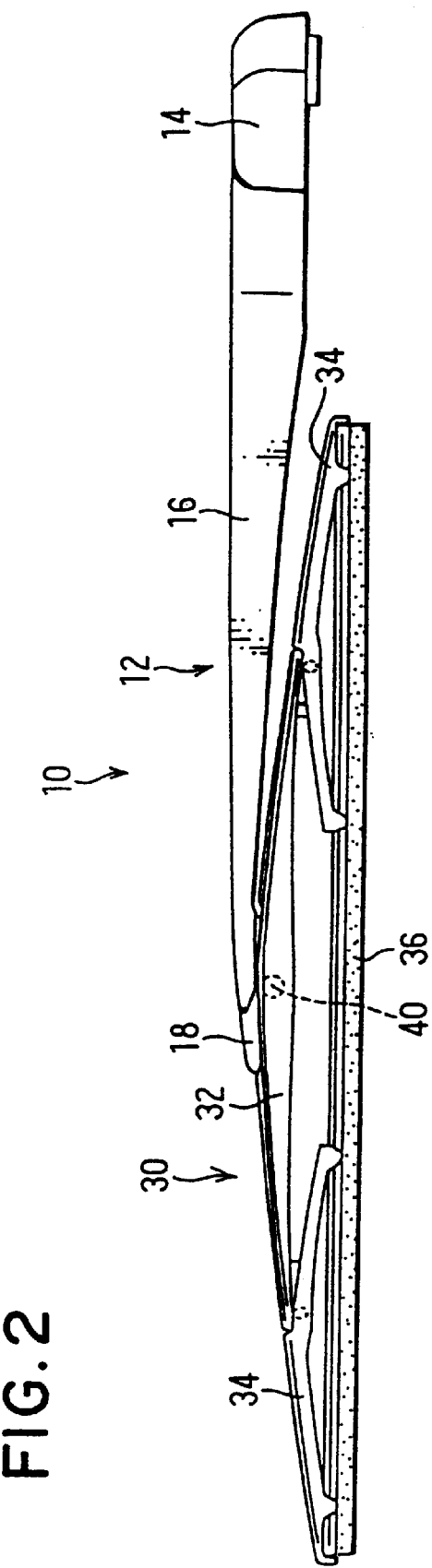
FIG. 2 is a front perspective view showing the wiper arm and blade according to the first embodiment of the present invention.

As shown in FIG. 2, a wiper device 10 has a wiper arm 12 and a wiper blade 30. The wiper arm 12 is provided with an arm head 14 to be fixed to a pivot shaft (not shown). A retainer 16 is rotatably held at a leading end of the arm head 14. Further, a plastic arm piece 18 is integrally formed at a leading end of the retainer 16. As shown in FIGS. 1A to 1D, a leading end portion of the arm piece 18 is provided with a connecting hole 20. The connecting hole 20 is provided at a part of the, circumference thereof with an opening 26 and constitutes a supporting portion for connecting the wiper blade 30, as described later.

An elastically deformable element 22 is provided near the connecting hole 20 in the arm piece 18. The elastically deformable element 22 is formed in a square or rectangular frame shape as a whole so as to protrude toward the wiper blade 30 and has a predetermined elasticity. The elastically deformable element 22 is provided at a corner on a lower end rear side thereof with a protruding portion 24, which may come in contact with an upper projection 44 of the wiper blade 30 to be described later. The elastically deformable element 22 and the upper projection 44 constitute an elastically deformable retaining means.

On the other hand, the wiper blade 30 is composed of a plastic primary lever 32, secondary levers 34 and a blade rubber 36.

A cross section of the primary lever 32 is formed in a near letter opposite U shape and is provided at a center portion thereof with a supporting shaft 40 bridging two sidewalls 38 facing each other and extending in a longitudinal direction. The primary lever 32 has a center bore 39 above the supporting shaft 40. The center bore 39 is constituted by making an opening on an upper side wall at a center portion of the primary lever 32 between the two side walls 38. A length in the center bore 39 between the two side walls 38 is larger than a width length of the arm piece 18. Thus, by inserting the arm piece 18 between the two side walls 38 and making the supporting shaft 40 of the primary lever 32 move through the opening 26 into the connecting hole 20 of the arm piece 18 in the center bore 39, the wiper arm 12 rotatably supports the wiper blade 30.

Figure 3:
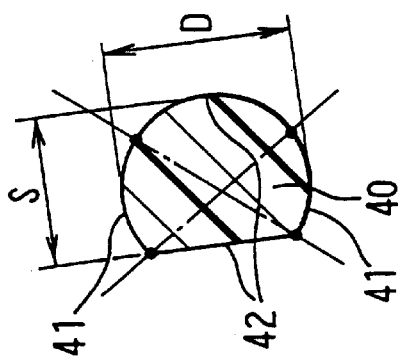
FIG. 3 is a cross sectional view of a supporting shaft provided at the wiper blade according to the first embodiment of the present invention.

As shown in FIGS. 1A and 3, the supporting shaft 40 has a small diameter portion 42 (second diameter portion) whose diametric length (S) is smaller than a diametric length (D) of the other part 41 (first diameter portion 41) in a cross section taken along a line perpendicular to an axial direction thereof in such a manner, for example, that the cross section of the supporting shaft 40 is formed in a letter D shape. The small diameter portion 42 is defined by circumferential portions of the supporting shaft 40 covering a first predetermined angle zone of the wiper blade 30 to the wiper arm 12 (first angle position). The first angle position includes a rotating position of the wiper blade 30 relative to the wiper arm 12 as shown in a solid line of FIG. 1D, for example 60 degrees.

On the other hand, the connecting hole 20 of the arm piece 18 has at the circumference thereof an opening 26 whose chord length (straight portion length) is smaller than the diametric length (D) of the first diameter portion 41 but larger than the diametric length (S) of the second diameter portion 42 (the small diameter portion 42). The supporting shaft 40 may be coupled with the connecting hole 20 by making the second diameter portion 42 correspond to the opening 26. That is, an attachable and detachable region for the wiper arm and blade 12 and 30 is constituted by the first angle position.

As shown in FIGS. 1A to 1C, when the wiper arm 12 is rotated relatively to the wiper blade 30 centering around the supporting shaft 40 to a second predetermined angle zone of the wiper blade 30 to the wiper arm 12 where the small diameter portion 42 does not correspond to the opening 26 (a second angle position), the supporting shaft 40 can not be disengaged with the connecting hole 20. That is, a non-attachable and non-detachable region is constituted by the second angle position that is a position in a normal use of the wiper device.

Further, at the second position, more than half of an outer circumference surface of the supporting shaft 40 in the connecting hole 20 comes in sliding contact with an inner circumference surface of the connecting hole 20 during the normal use of the wiper device.

Furthermore, at a transient third angle position between the first and second positions, as shown in FIGS. 1B and 1C, for example, during angles from 27 degrees 12 minutes to 19 degrees 48 minutes, the protruding portion 24 of the elastically deformable element 22 of the arm piece 18 comes in contact with the upper projection 44 of the primary lever 32 when the wiper blade 30 is rotated relatively to the wiper arm 12 from the first angle position toward the second angle position or from the second angle position toward the first angle position. Therefore, when the wiper blade 30 is at the second angle position during the normal use of the wiper device, the excessive rotation of the wiper blade 30 relative to the wiper arm 12 from the second angle position beyond the third angle position, that is, from a state shown in FIG. 1A beyond a state shown in FIG. 1B, may be restricted.

However, when the wiper blade 30 is rotated relatively to the wiper arm 12 from the first angle position to the second angle position through the third angle position, that is, from a state shown in FIG. 1D to a state shown in FIG. 1A through states shown in FIGS. 1C and 1B, the relative rotation of the wiper blade 30 to the wiper arm 12 is once restricted by the elastically deformable restraining means at the third angle position. However, if the protruding portion 24 of the elastically deformable element 22 is forcibly deformed to get over the upper projection 44 as shown in two dots-slash line of FIG. 1C, the wiper blade 30 may move to the second angle position.

Next, a coupling function of the wiper blade 30 and the wiper arm 12 according to the first embodiment is described in more detail.

With the construction mentioned above, the wiper arm 12 (the connecting hole 20 of the arm piece 18) rotatably supports the wiper blade 30 (supporting shaft 40 of the primary lever 32) during the normal use of the wiper device 10.

When the wiper blade 30 is rotated relatively to the wiper arm 12 around the supporting shaft 40 from the second angle position (shown in FIG. 1A) toward the first angle position, the relative rotation of the wiper blade 30 to the wiper arm 12 is restricted by the elastically deformable restraining means (by the elastically deformable element 22 in contact with the upper projection 44) at the third angle position as shown in FIG. 1B. Therefore, the relative rotation of the wiper blade 30 to the wiper arm 12 is kept at the second angle position from the state shown in FIG. 1A to the state shown in FIG. 1B during the normal use of the wiper device and excessive rotation beyond the third angle position is restricted. Thus, when the wiper arm 12 is rocked back for a purpose of maintenance, the vehicle body or the wind shield glass may be prevented from damages due to the unintentional excessive rotation of the wiper blade 30 relative to the wiper arm 12.

Further, when, after the relative rotation of the wiper blade 30 is once restricted, a stronger force is applied to the wiper blade 30 so as to further rotate relatively to the wiper arm 12, the protruding portion 24 is deformed to get over the upper projection 44. As a result, the restriction by the elastically deformable restraining means is released so that the wiper blade and arm 30 and 12 may not be harmed.

Furthermore, in case that the wiper blade 30 is detached from the wiper arm 12, the wiper blade 30 is placed at the first angle position as shown in FIG. 1D so that the small diameter portion 42 (second diameter portion) of the supporting shaft 40 may correspond to the opening 26 of the connecting hole 20. As the length of the opening 26 is larger than the diametric length (S) of the small diameter portion 42, the supporting shaft 40 may get out of the connecting hole 20 without a large force so that the wiper blade 30 may be easily detached from the wiper arm 12.

As mentioned above, the coupling construction of the wiper blade 30 and wiper arm 12 does not rely on the elastic supporting force on the supporting shaft, as shown in the conventional structure, the coupling construction of the first embodiment is so stable that the wiper blade 30 may not be unintentionally disengaged with the wiper arm 12 during the normal use of the wiper device.

AS more than half of an outer circumference surface of the supporting shaft 40 in the connecting hole 20 comes in sliding contact with an inner circumference surface of the connecting hole 20 at the second angle position in the normal use of the wiper device, even if the supporting shaft 40 has the second portion whose diametric length is smaller than the length of the opening 26, the supporting shaft 40 never comes out of the connecting hole 20 through the opening 26 and does not rattle in the connecting hole 20 during the normal use of the wiper device.

Further, in place of the elastically deformable element 22 provided at the wiper arm 12 (arm piece 18) and the upper projection 44 provided at the wiper blade 30 in the first embodiment mentioned above, the elastically deformable element 22 may be provided at the wiper blade 30 (primary lever 32) and the projection 44 may be provided at the wiper arm 12.

Furthermore, as the elastically deformable restraining means restricts the excessive relative rotation of the wiper blade 30 to the wiper arm 12 from the second angle position to the first angle position, it is not essential that the supporting shaft 40 has the small diameter portion 42 formed by cutting in the letter D shape and the connecting hole 20 is provided with the opening 26 in such a way as described in the first embodiment but may be sufficient that the supporting shaft 40 is just coupled with the connecting hole 20 by some other ways and the elastically deformable element 22 and the projection 44 are provided at the wiper arm and blade 12 and 30, respectively, for restricting the excessive rotation of the wiper blade 30 to the wiper arm 12 between the first and second angle positions.

With the construction mentioned above, when the wiper arm 12 is rocked back for a purpose of maintenance, the vehicle body or wind shield glass may be prevented from damages due to the wiper blade 30 unintentionally excessively rotated relative to the wiper arm 12. Further, the wiper arm and blade 12 and 30 may be prevented from damages as the wiper arm 12 is disengaged with the wiper blade 30 by making the protruding portion 24 get over the projection 44 due to the intentional excessive rotation of the wiper blade 30 to the wiper arm 12.

Next, a second embodiment of the present invention is described with reference to FIGS. 4A to 4D.

A wiper blade 52 of a wiper device 50 according to the second embodiment is used as a winter blade. Each lever assembly of the wiper blade 52 to be coupled with the wiper arm 12 is covered by rubber sealing element 54. The rubber sealing element 54 prevents snow from invading into inside of the lever assembly.

A metal clip holder 58 is provided at a portion above a longitudinal center of the primary lever 56. The clip holder 58 is provided with a center bore 62 and the supporting shaft 40 mentioned above. Further, the clip holder 58 is provided with an engaging portion 60, which corresponds to the upper projection 44 of the primary lever 32 mentioned before. The engaging portion 60 is formed by folding down a part of an upper wall at a periphery of the center bore 62. The protruding portion 24 of the elastically deformable element 22 of the arm piece 18 is engaged elastically with the engaging portion 60.

The other parts and components of the wiper device 50 according to the second embodiment is similar to those of the wiper device 10 according to the first embodiment.

Next, a coupling function of the wiper blade 52 and the wiper arm 12 according to the second embodiment is described in more detail.

With the construction mentioned above, the wiper arm 12 (the connecting hole 20 of the arm piece 18) rotatably supports the wiper blade 52 (supporting shaft 40 of the clip holder 58) during the normal use of the wiper device 50.

Figure 4A:
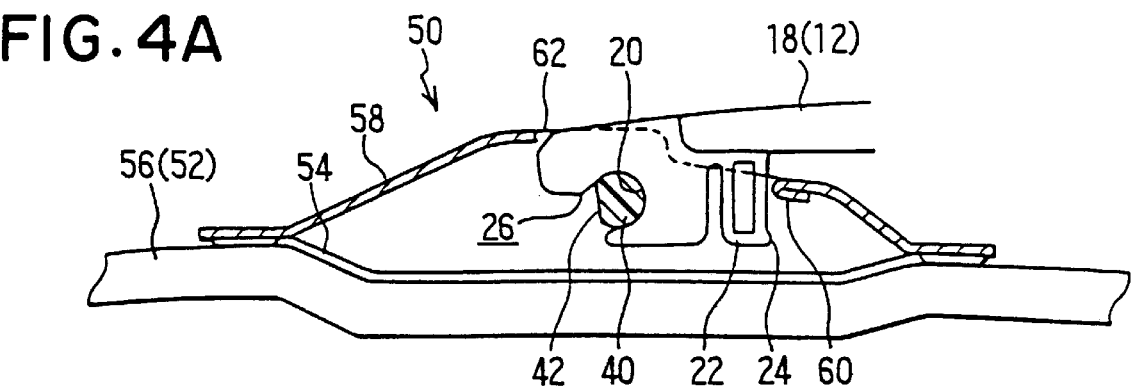
FIG. 4A is a first cross sectional view showing a relative rotation of a wiper blade to a wiper arm according to a second embodiment of the present invention.
Figure 4B:
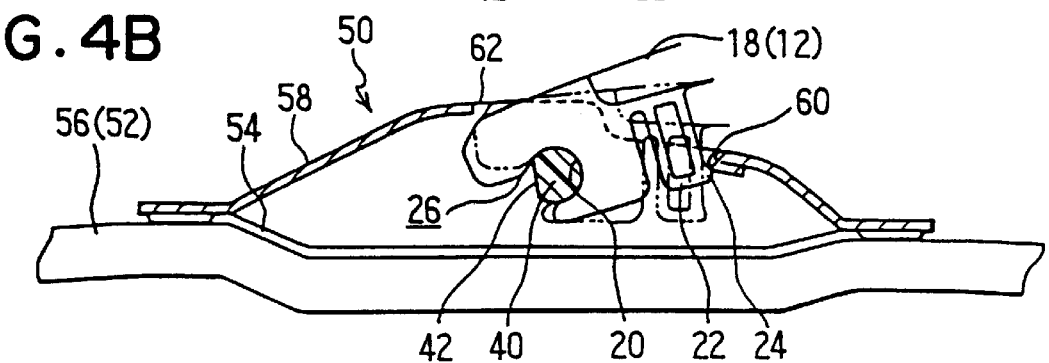
FIG. 4B is a second cross sectional view showing the relative rotation of the wiper blade to the wiper arm according to the second embodiment of the present invention.
Figure 4C:
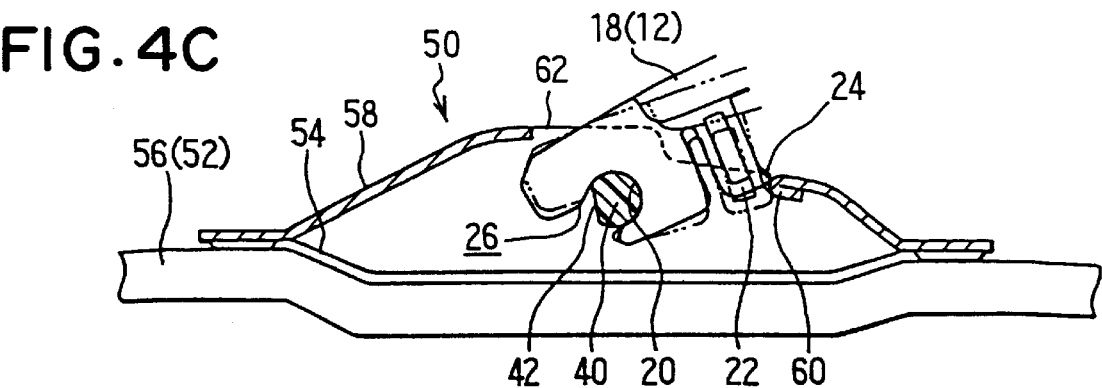
FIG. 4C is a third cross sectional view showing the relative rotation of the wiper blade to the wiper arm according to the second embodiment of the present invention.

When the wiper blade 52 is rotated relatively to the wiper arm 12 around the supporting shaft 40 from a second angle position (shown in FIG. 4A) toward a first angle position, the relative rotation of the wiper blade 52 to the wiper arm 12 is restricted by the elastically deformable restraining means (by the elastically deformable element 22 in contact with the engaging portion 60) at the third angle position as shown in FIG. 4B. Therefore, the relative rotation of the wiper blade 52 to the wiper arm 12 is kept at the second angle position from the state shown in FIG. 4A to the state shown in FIG. 4B during the normal use of the wiper device 50 and excessive rotation beyond the third angle position is restricted. Thus, when the wiper arm 12 is rocked back for a purpose of maintenance, the vehicle body or the wind shield glass may be prevented from damages due to the unintentional excessive rotation of the wiper blade 52 relative to the wiper arm 12.

Further, when, after the relative rotation of the wiper blade 52 to the wiper arm 12 is once restricted, a stronger force is applied to the wiper blade 52 so as to further rotate relatively to the wiper arm 12, the protruding portion 24 is deformed to get over the engaging portion 60. As a result, the restriction by the elastically deformable restraining means is released so that the wiper blade and arm 52 and 12 may not be damaged.

Figure 4D:
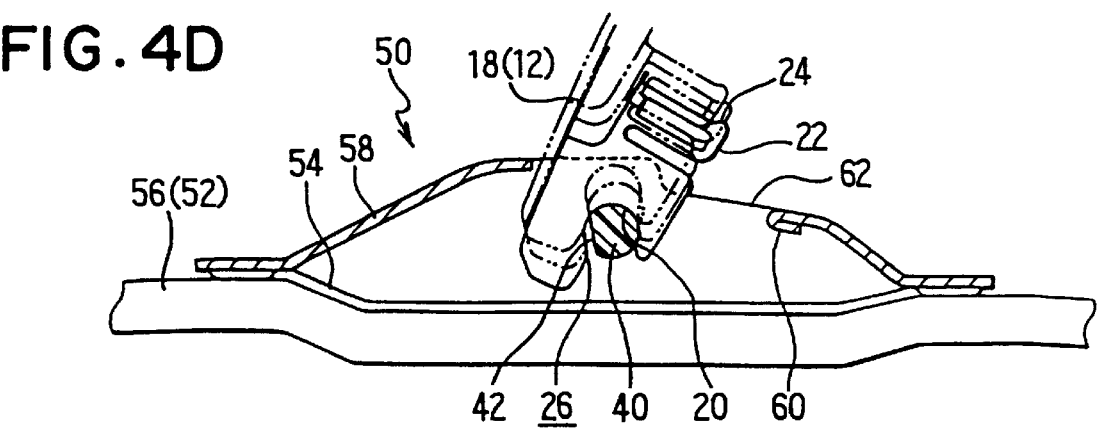
FIG. 4D is a fourth cross sectional view showing the relative rotation of the wiper blade to the wiper arm according to the second embodiment of the present invention.

Furthermore, in case that the wiper blade 52 is detached from the wiper arm 12, the wiper blade 52 is placed at the first angle position as shown in FIG. 4D so that the small diameter portion 42 (second diameter portion) of the supporting shaft 40 may correspond to the opening 26 of the connecting hole 20. Thus, the supporting shaft 40 may get out of the connecting hole 20 without a large force so that the wiper blade 52 may be easily detached from the wiper arm 12.

As mentioned above, the coupling construction of the wiper blade 52 and wiper arm 12 does not rely on the elastic supporting force on the supporting shaft, as shown in the conventional structure, the coupling construction of the second embodiment is so stable that the wiper blade 52 may not be unintentionally disengaged with the wiper arm 12 during the normal use of the wiper device.

AS more than half of an outer circumference surface of the supporting shaft 40 in the connecting hole 20 comes in sliding contact with an inner circumference surface of the connecting hole 20 at the second angle position in the normal use of the wiper device, even if the supporting shaft 40 has the second diameter portion 42 whose diametric length is smaller than the length of the opening 26, the supporting shaft 40 never comes out of the connecting hole 20 through the opening 26 and does not rattle in the connecting hole 20 in the normal use of the wiper device.

Figure 5A:
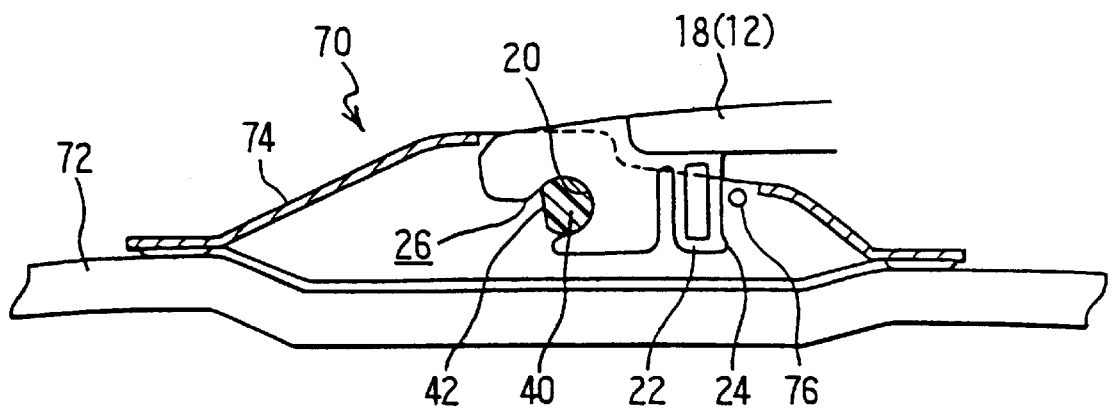
FIG. 5A is a first cross sectional view showing a relative rotation of a wiper blade to a wiper arm according to a modification of the second embodiment of the present invention.
Figure 5B:
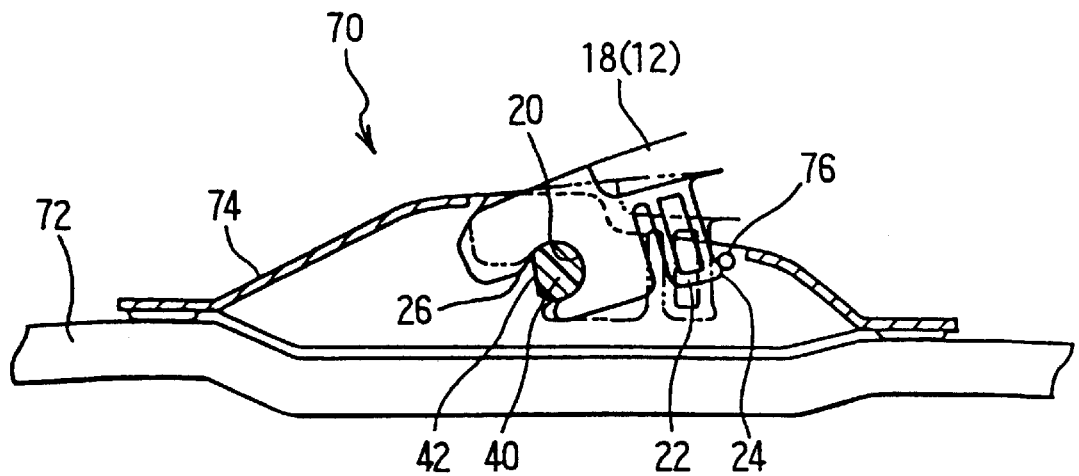
FIG. 5B is a second cross sectional view showing the relative rotation of the wiper blade to the wiper arm according to the modification of the second embodiment of the present invention.

Further, as a modification of the second embodiment, in place of the engagement portion 60 of the clip holder 58 provided at the periphery of the center bore 62, an engaging pin 76 may be provided between two side walls of a clip holder 74 of a wiper blade 72 of a wiper device 70 similarly to the supporting shaft 40, as described in FIGS. 5A and 5B. The rotation of the wiper blade 72 relative to the wiper arm 12 may be restricted by engaging the elastically deformable element 22 (protruding portion 24) with the engaging pin 76.

Moreover, in place of the elastically deformable element 22 provided at the wiper arm 12 (arm piece 18) and the engaging portion 60 or engaging pin 76 provided at the clip holder 58 or 74 in the second embodiment mentioned above or the modification thereof, the elastically deformable element 22 may be provided at the clip holder 58 or 74 and the engaging portion 60 or engaging pin 76 may be provided at the wiper arm 12.

A wiper device 80 according to a third embodiment of the present invention is described with reference to FIG. 6.

The wiper device 80 has an arm piece 81 of a wiper arm 83 and a primary lever 82 of a wiper blade 84. The primary lever 82 is provided at a longitudinal center portion thereof with a center bore surrounded by the two side walls 38 mentioned before and two end walls 86 facing to each other and extending perpendicularly to a longitudinal axis thereof. The arm piece 81 is inserted into the center bore for coupling with the primary lever 82.

A clearance between inner surface of the end wall 86 and a leading end surface 85 of the arm piece 83 is necessary for the primary lever 82 (wiper blade 84) to rotate in the center bore relatively to the arm piece 81 (wiper arm 83). The inner surface of the end wall 86 is inclined or shaped as an arc in a manner that the clearance between the inner surface of the end wall 86 and the leading end surface 85 of the arm piece 81 becomes wider in a depth direction thereof. AS a result, the clearance A at an upper periphery of the end wall 85 is smallest among others when the wiper device is normally used. Therefore, snow, stone pieces or other foreign material is prevented from being stuck in the clearance.

Figure 7:
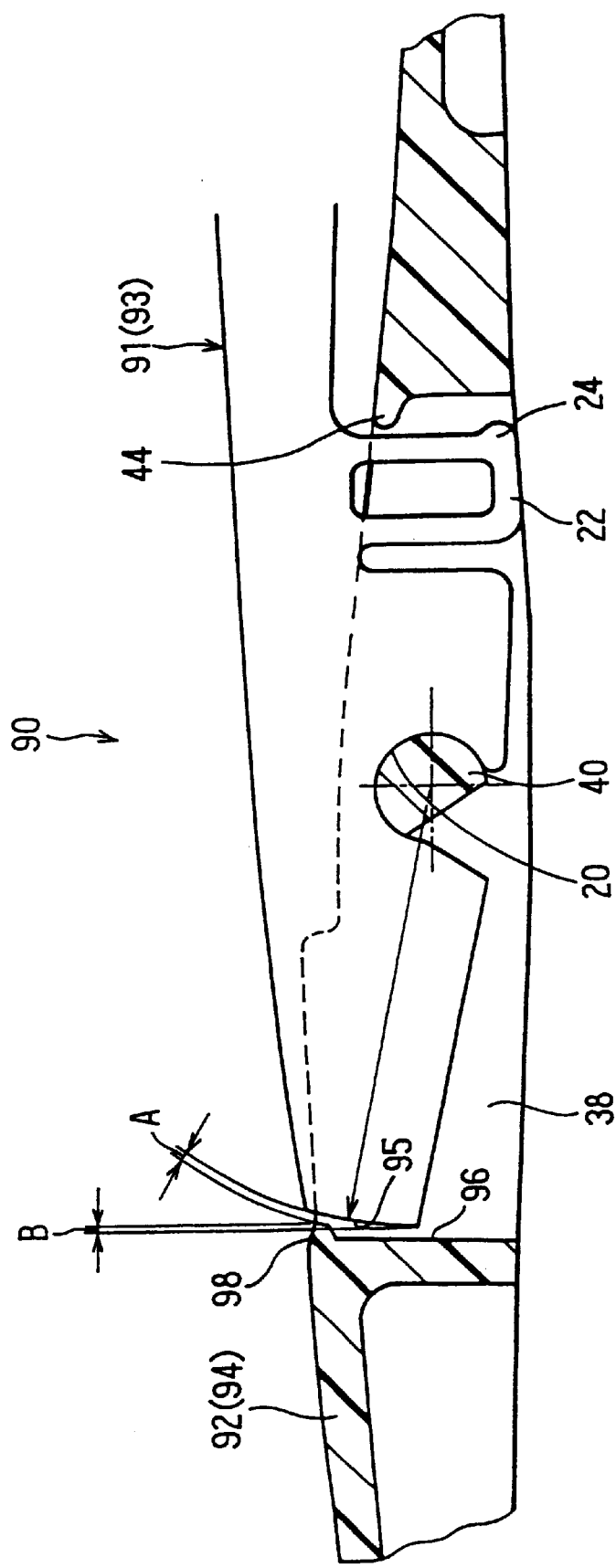
FIG. 7 is a cross sectional view showing an another coupling construction of wiper arm and blade according to a third embodiment of the present invention.

Further, a modification of the third embodiment is shown in FIG. 7. A wiper device 90 has an arm piece 91 of a wiper arm 93 and a primary lever 92 of a wiper blade 94. The primary lever 92 is provided at a longitudinal center portion thereof with a center bore surrounded by the two sidewalls 38 mentioned before and two end walls 96 facing to each other and extending perpendicularly to a longitudinal axis thereof. The arm piece 91 is inserted into the center bore for coupling with the primary lever 92.

A protruding portion 98 is provided at an upper periphery surface of the end wall 96. The leading end surface 95 of the arm piece 91 is shaped as an arc having a center on an axis of the connecting hole 20. A clearance A between the upper periphery surface of the end wall 85 and the leading end surface 95 of the arm piece 91 is smaller than a clearance between any other surface of the end wall 85 and the leading end surface 95 of the arm piece 91 in a normal use of the wiper device. Further, the surface of the end wall 96 overlaps at least partly, by a distance B as shown in FIG. 7, the leading end surface 95 of the arm piece 91 as viewed perpendicularly to the longitudinal axis of the primary lever 92 so that a view through the clearance from one side to the other side may be obstructed. As a result, snow, stone pieces or other foreign material is prevented from being stuck in the clearance.

Figure 8:
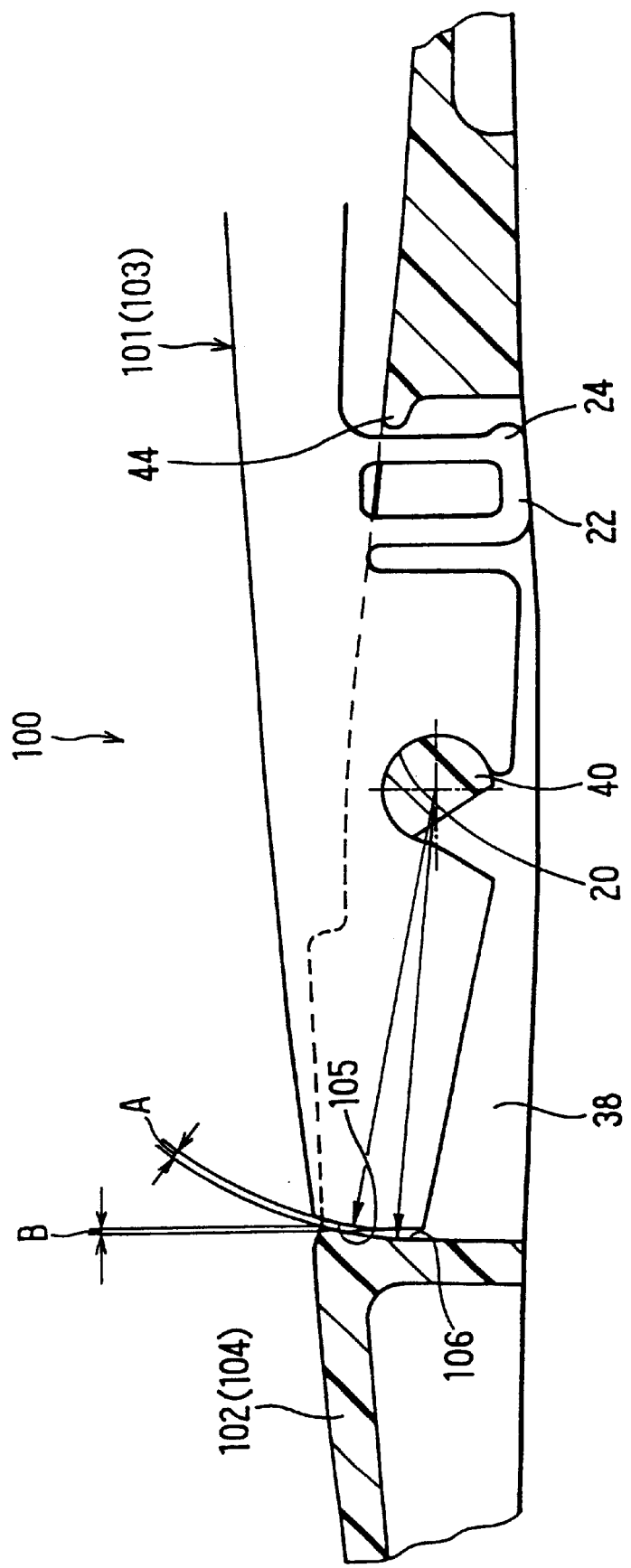
FIG. 8 is a cross sectional view showing a further coupling construction of wiper arm and blade according to a third embodiment of the present invention.

An another modification of the third embodiment is shown in FIG. 8. A wiper device 100 has an arm piece 101 of a wiper arm 103 and a primary lever 102 of a wiper blade 104. The primary lever 102 is provided at a longitudinal center portion thereof with a center bore surrounded by the two side walls 38 mentioned before and two end walls 106 facing to each other and extending perpendicularly to a longitudinal axis thereof. The arm piece 101 is inserted into the center bore for coupling with the primary lever 102.

The surface of the end wall 106 is formed in an arc shape having a center on an axis of the supporting shaft 40 and the leading end surface 105 of the arm piece 101 is also shaped as an arc having a center on a center axis of the connecting hole 20 to constitute a concentric arc with that of the Surface of the inner wall 106. AS a result, a clearance A between an upper periphery surface of the end wall 106 and the leading end surface 105 of the arm piece 101 is substantially equal to a clearance between any other surface of the end wall 106 and the leading end surface 105 of the arm piece 101 at a normal use of the wiper device.

The surface of the end wall 106 overlaps at least partly, by a distance B, the leading end surface 105 of the arm piece 101 as viewed perpendicularly to the longitudinal axis of the primary lever 102 so that a view through the clearance from one side to the other side may be obstructed. As a result, snow, stone pieces or other foreign material is prevented from being stuck in the clearance.

What is claimed is:

1. Wiper device for wiping a wind shield glass of a vehicle having a coupling construction of a wiper arm and a wiper blade comprising:

a center bore provided in a center portion of the wiper blade;

a supporting shaft extending transversely to a longitudinal axis of the wiper blade in the center bore, the supporting shaft having first and second diameter portions extending respectively in an axial direction thereof at a circumference thereof and a diametric length of the second diameter portion being smaller than that of the first diameter portion; and a connecting hole provided transversely to a longitudinal axis of the wiper arm at a leading end portion of the wiper arm, the connecting hole being provided at a circumference thereof with an opening whose chord length is larger than the diametric length of the second diameter portion but smaller than the diametric length of the first diameter portion, wherein the wiper blade may be attached to and detached from the wiper arm by making the second diameter portion correspond to the opening and moving the second diameter portion through the opening into and out of the connecting hole in the center bore, but the wiper blade may not be detached from the wiper arm at a normal operation of the wiper device by rotating the wiper blade relatively to the wiper arm till a position where the second diameter portion does not correspond to the opening in the connecting hole, and wherein the wiper blade comprises a lever assembly with a sealing element covering an entire portion of the lever assembly, a clip holder affixed to the lever assembly through the sealing element, and blade rubber held by the lever assembly for wiping the wind shield glass, the center bore and the supporting shaft being disposed in the clip holder so that the lever assembly may be rotatably supported by the wiper arm.

2. Wiper device according to claim 1, further comprising:

an elastically deforming restraining means provided at the clip holder and the wiper arm for restraining an excessive rotation of the wiper blade relative to the wiper arm in the normal use of the wiper device so that the second diameter portion may not correspond to the opening and the wiper blade may not be detached from the wiper arm.

3. Wiper device according to claim 2, wherein the elastically deforming restraining means comprises an elastic element disposed on the wiper arm on an another leading end portion side of the wiper arm with respect to the connecting hole and a retaining element provided at the clip holder for retaining the elastic element when the wiper blade is excessively rotated relative to the wiper arm.

4. Wiper device according to claim 3, wherein the retaining element is formed by folding down a part of a periphery of the center bore.

5. Wiper device for wiping a wind shield glass of a vehicle having a coupling construction of a wiper arm and a wiper blade comprising:

a center bore provided in a center portion of the wiper blade; wherein the center bore has an inner wall facing to a leading end surface of the wiper arm and a clearance between an upper periphery surface of the inner wall and the leading end surface of the wiper arm is either equal to or smaller than a clearance between a lower periphery surface of the inner wall and the leading end surface of the wiper arm;

a supporting shaft extending transversely to a longitudinal axis of the wiper blade in the center bore, the supporting shaft having first and second diameter portions extending respectively in an axial direction thereof at a circumference thereof and a diametric length of the second diameter portion being smaller than that of the first diameter portion; and a connecting hole provided transversely to a longitudinal axis of the wiper arm at a leading end portion of the wiper arm, the connecting hole being provided at a circumference thereof with an opening whose chord length is larger than the diametric length of the second diameter portion but smaller than the diametric length of the first diameter portion, wherein the wiper blade may be attached to and detached from the wiper arm by making the second diameter portion correspond to the opening and moving the second diameter portion through the opening into and out of the connecting hole in the center bore, but the wiper blade may not be detached from the wiper arm at a normal operation of the wiper device by rotating the wiper blade relatively to the wiper arm till a position where the second diameter portion does not correspond to the opening in the connecting hole.

6. Wiper device according to claim 5, wherein the upper periphery surface of the inner wall overlaps at least partly the leading end surface of the wiper arm as viewed perpendicularly to the longitudinal axis of the wiper blade so that a view through the clearance between the surface of the inner wall and the leading end surface of the wiper arm.may be obstructed.

7. Wiper device according to claim 5, wherein the clearance between the upper periphery surface of the inner wall and the leading end surface of the wiper arm is set in either a manner that the surface of the inner wall is shaped as an arc having a center on an axis of the supporting shaft or another manner that a projecting portion protruding toward the leading end surface of the wiper arm is provided at the upper periphery portion of the inner wall.

8. Wiper device according to claim 7, wherein the leading end surface of the wiper arm is shaped as an arc having a center on a center axis of the connecting hole concentrically with that of the surface of the inner wall.

9. Wiper device for wiping a wind shield glass of a vehicle having a coupling construction of a wiper arm and a wiper blade comprising:

a center bore provided in a center portion of the wiper blade;

a supporting shaft extending transversely to a longitudinal axis of the wiper blade in the center bore;

a connecting hole provided transversely to a longitudinal axis of the wiper arm at a leading end portion of the wiper arm, and an elastically deforming restraining means provided at the wiper arm and blade for restricting the relative rotation of the wiper blade to the wiper arm, wherein the wiper blade may be attached to and detached from the wiper arm by moving the supporting shaft into and out of the connecting hole at a first angle position that is at a first predetermined angle zone of the wiper blade to the wiper arm, but the wiper blade may not be detached from the wiper arm by rotating the wiper blade relatively to the wiper arm till a second angle position that is at a second predetermined angle zone of the wiper blade to the wiper arm in a normal use of the wiper device through a transient third angle position between the first and second angle positions where the wiper blade is forcibly rotated relatively to the wiper arm so as to get over the elastically deforming restraining means, and further wherein the elastically deforming restraining means is so operative that, once the wiper blade is at the second angle position, the wiper blade may not move easily from the second angle position to the first angle position during the normal use of the wiper device, and wherein the wiper blade comprises a lever assembly with a sealing element covering an entire portion of the lever assembly, a clip holder affixed to the lever assembly through the sealing element, and blade rubber held by the lever assembly for wiping the wind shield glass, the center bore and the supporting shaft being disposed in the clip holder so that the lever assembly may be rotatably supported by the wiper arm.

10. Wiper device according to claim 9, wherein the elastically deforming restraining means is provided at the clip holder and the wiper arm.

11. Wiper device according to claim 10, wherein the elastically deforming restraining means comprises an elastic element disposed on the wiper arm on an another leading end portion side of the wiper arm with respect to the connecting hole and a retaining element provided at the clip holder for retaining the elastic element on rotating the wiper blade relative to the wiper arm from the second position to the first position.

12. Wiper device according to claim 11, wherein the retaining element is formed by folding down a protruding part of a periphery of the center bore.

13. Wiper device for wiping a wind shield glass of a vehicle having a coupling construction of a wiper arm and a wiper blade, comprising:

a center bore provided in a longitudinally center of the wiper blade;

a supporting shaft extending perpendicularly to a longitudinal axis of the wiper blade in the center bore;

a connecting hole provided perpendicularly to a longitudinal axis of the wiper arm, which is made of plastic material, at an end of the wiper arm, the wiper blade being attached to the wiper arm and rotatable relatively to the wiper arm in first and second angle zones relative to the wiper arm in a state that the supporting shaft is coupled with the connecting hole; and an elastically deforming restraining means having an elastic element provided integrally with the wiper arm on a side opposite to a leading end thereof with respect to the connecting hole so as to protrude perpendicularly to an axis of the connecting hole said elastic element provided on said wiper arm to define a gap between the elastic element and said wiper arm, and a retaining element provided in the wiper blade at an upper periphery edge of the center bore on a side opposite to the supporting shaft, a cross section of the elastic element taken along a line perpendicular to the axis of the connecting hole being formed in an open rectangular frame shape, wherein the wiper blade can be detached from the wiper arm by moving the supporting shaft out of the connecting hole at a first angle position within the first angle zone relative to the wiper arm but can not be detached there from at second and third angle positions within the second angle zone relative to the wiper arm, the third angle position being a position angularly apart from the first angle position where the elastic element comes in contact with the retaining element and, if the wiper blade is forcibly rotated relatively to the wiper arm, the elastic element is elastically deformed in a longitudinal direction of the wiper arm to get over the retaining element and the second angular position being a position further angularly apart from the first angle position and, once the wiper blade is brought to the second angle position beyond the third angle position, the wiper blade can not move back easily from the second angle position to the first angle position due to the elastically deforming retaining means unless the wiper blade is forcibly rotated relatively to the wiper arm.

14. Wiper device according to claim 13, wherein the supporting shaft has first and second diameter portions extending respectively in an axial direction at a circumference thereof and a diametric length of the second diameter portion being smaller than that of the first diameter portion and the connecting hole is provided at a circumference thereof with an opening whose chord length is larger than the diametric length of the second diameter portion but smaller than the diametric length of the first diameter portion, and further wherein the first angle position is a position where the second diameter portion corresponds to the opening so as to be moved through the opening into and out of the connecting hole when the wiper blade is attached to and detached from the wiper arm.

15. Wiper device according to claim 13, wherein the cross section of the elastic element taken along a line perpendicular to the axis of the connecting hole is formed in a square frame shape.

* * * * *